D. SMAIL.
AUTOMOBILE WHEEL.
APPLICATION FILED SEPT. 24, 1915.
1,190,027.
Patented July 4, 1916.
2 SHEETS—SHEET 2.
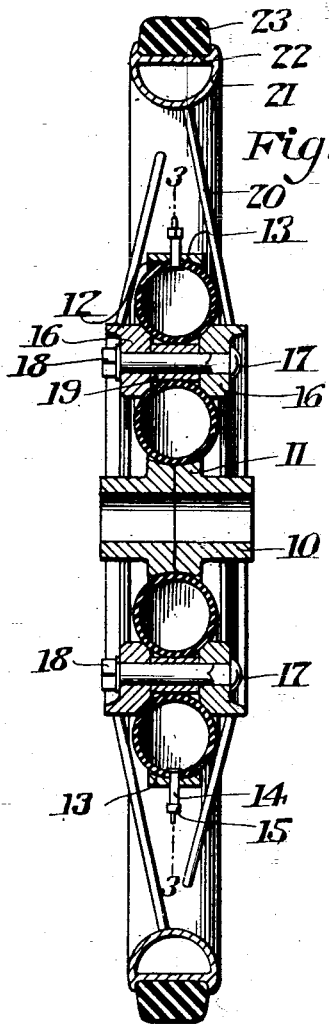
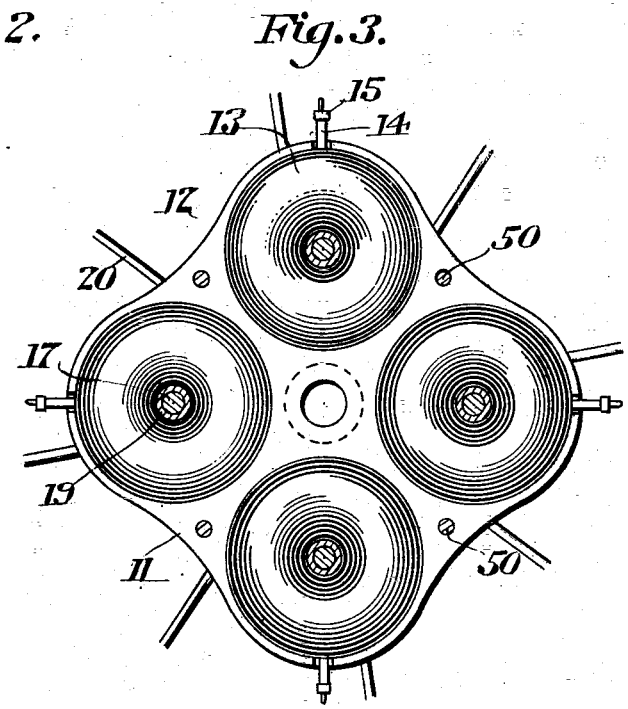
Witnesses
Inventor
David Smail
By Victor J. Evans
Attorney

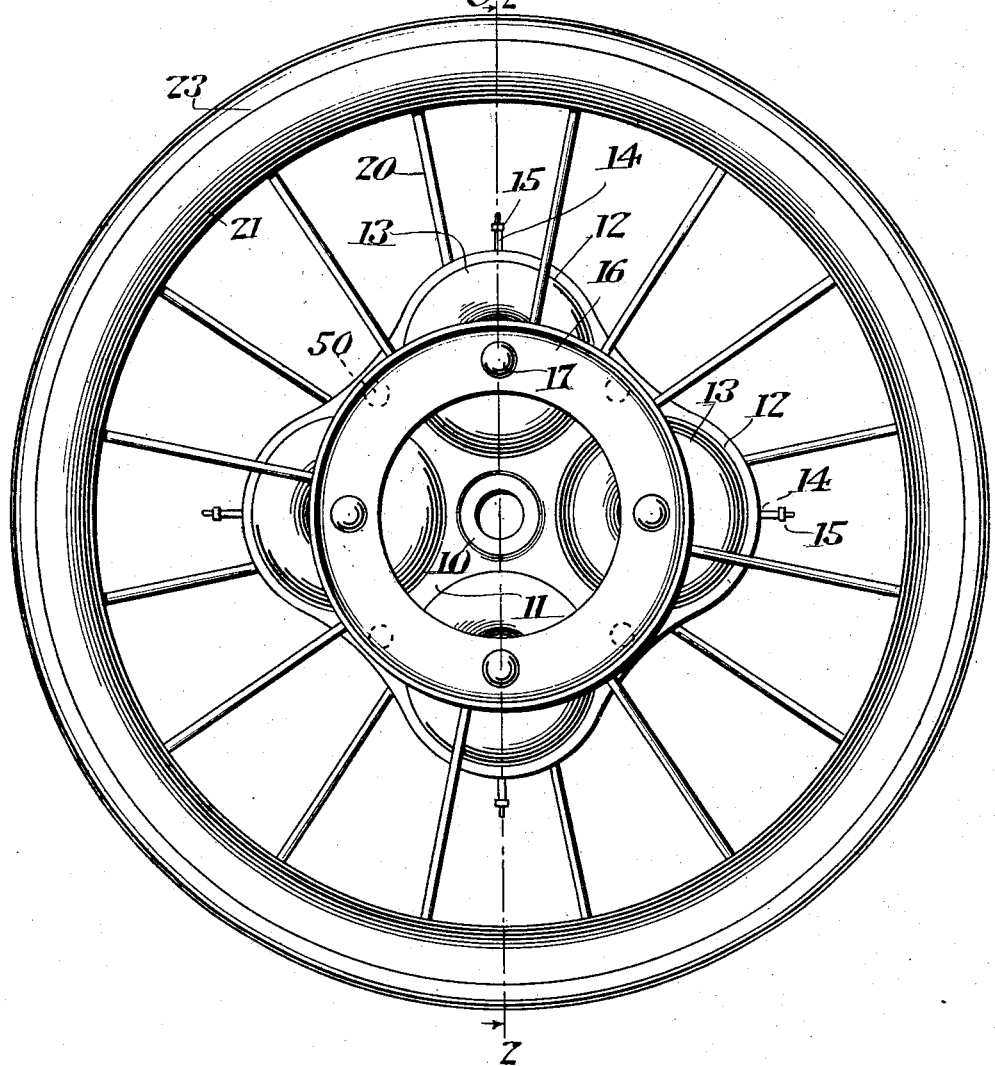

UNITED STATES PATENT OFFICE.

DAVID SMAIL, OF MOSCOW, IOWA.

AUTOMOBILE-WHEEL.

1,190,027.  Specification of Letters Patent.  Patented July 4, 1916.

Application filed September 24, 1915. Serial No. 52,471.

*To all whom it may concern:*

Be it known that I, DAVID SMAIL, a citizen of the United States, residing at Moscow, in the county of Muscatine and State of Iowa, have invented new and useful Improvements in Automobile-Wheels, of which the following is a specification.

This invention relates to wheel structures, and more particularly to the class of resilient wheels for vehicles, automobiles, or the like.

The primary object of the invention is the provision of a wheel of this character wherein the same is of novel form to eliminate the use of a pneumatic tire, so as to avoid the possibilities of punctures, blow-outs, rim or curb chafing, and thus increase the life of the tire and the wheel carrying the same.

Another object of the invention is the provision of a wheel of this character wherein the required resiliency is had without the use of a pneumatic tire for absorbing all of the shocks and jars incident to the travel of the wheel.

A further object of the invention is the provision of a wheel of this character wherein the strength thereof is materially increased and wherein the wheel will possess minimum weight to assure lightness without destroying the durability thereof.

A further object of the invention is to provide a wheel of this character which shall be simple and inexpensive in manufacture.

With these and other objects in view, the invention consists in the construction, combination and arrangement of parts as will be hereinafter fully described, illustrated in the accompanying drawing, and pointed out in the claim hereunto appended.

In the drawings: Figure 1 is a side elevation of a wheel constructed in accordance with this invention; Fig. 2 is a sectional view on the line 2—2 of Fig. 1; and Fig. 3 is a fragmentary vertical longitudinal sectional view on the line 3—3 of Fig. 2.

Similar reference characters indicate corresponding parts throughout the several views in the drawings.

Referring to the drawings in detail, the wheel comprises a two-part or sectional hub 10, preferably made from metal and which has its separation centrally thereof and is adapted to be journaled on an axle in the usual well known manner. Formed centrally of the hub or at the inner ends of the respective sections thereof are substantially rectangular shaped webs 11 which abut each other and have therein oppositely disposed circular shaped recesses 12 which are arranged concentrically about the said hub 10 and provide seats in which are held annular inflatable tubes 13, each being provided with an air inlet stem 14 which is projected through suitable companion notches opening through the outer edges of the webs from the recesses 12 therein so that access may be had to the stem 14 for permitting the inflating of the tube and this stem carries the usual detachable cap 15.

Arranged against the outer faces of the webs 11 are spoke rings 16 through which at intervals are passed transverse bolts 17 carrying the usual nuts 18, and in this manner the rings are united to each other, while surrounding the bolts 17 between the rings 16 are sleeves 19 which are located in the open centers of the tubes 13, the latter being concentrically disposed about the said sleeves as shown. Fixed in the rings 16 are the inner ends of spokes 20 which have their outer ends fixed in an annular hollow felly 21, preferably made from metal, and likewise the rings 16 are preferably made from metal, while the spokes 20 are preferably made from tubes having the required rigidity and strength. Formed in the outer periphery of the felly 21 is a groove or channel 22 in which is seated an annular resilient tread or solid tire 23, the same being fastened in the channel or groove in any suitable manner.

During the travel of the wheel all shocks or jars incident thereto are imparted to the tubes 13 which are adapted to absorb the same and thus relieve said shocks and jars from the vehicle, automobile or the like. It will be apparent that the felly, by reason of the mounting of the rings relative to the inflatable tubes and also the particular mounting of the hub, will permit relative movement of the said felly and also the hub.

The flanges 11 on the sections of the hub 10 are secured together through the medium of transverse bolts or rivets 50 which are located at points between the recesses or seats 12 in the said webs, and in this manner the webs are held together as a unit.

From the foregoing description, taken in connection with the accompanying drawings, the construction and manner of operation of the device will be clearly understood, and, therefore, a more extended explanation has been omitted.

Having thus described my invention, I claim:

A wheel structure of the class described comprising a felly, a resilient tire mounted on the outer side of the felly, a two-part hub having cheeks provided with openings concentrically of the hub, ring-like inflatable elements arranged within the openings, annular members disposed on opposite sides of the cheeks, bolt members passed centrally through the inflatable ring-like members and also passed through the annular members, sleeves surrounding the bolt members and located centrally of the ring-like inflatable members, and spokes connecting the annular members to the felly.

In testimony whereof I affix my signature in presence of two witnesses.

DAVID SMAIL.

Witnesses:
HARRY DUFFE,
JAMES ADY.

Copies of this patent may be obtained for five cents each, by addressing the "Commissioner of Patents, Washington, D. C."